United States Patent
Fuqua et al.

(10) Patent No.: US 12,270,253 B1
(45) Date of Patent: Apr. 8, 2025

(54) CONVERTIBLE RAMP SYSTEM AND TACTICAL VEHICLE INCORPORATING A CONVERTIBLE RAMP SYSTEM

(71) Applicant: Patriot3, Inc., Fredericksburg, VA (US)

(72) Inventors: Charles Louis Fuqua, Woodbridge, VA (US); Steven Scott Kahre, Spotsylvania, VA (US)

(73) Assignee: Patriot3, Inc., Fredericksburg, VA (US)

( * ) Notice: Subject to any disclaimer, the term of this patent is extended or adjusted under 35 U.S.C. 154(b) by 0 days.

(21) Appl. No.: 18/139,019

(22) Filed: Apr. 25, 2023

Related U.S. Application Data

(63) Continuation of application No. 16/529,275, filed on Aug. 1, 2019, now Pat. No. 11,634,948.

(51) Int. Cl.
  E06C 5/42   (2006.01)
  B60R 3/00   (2006.01)
  E06C 5/06   (2006.01)
  E06C 5/24   (2006.01)

(52) U.S. Cl.
  CPC .............. E06C 5/42 (2013.01); B60R 3/005 (2013.01); E06C 5/06 (2013.01); E06C 5/24 (2013.01)

(58) Field of Classification Search
  CPC ... E06C 1/387; E06C 5/04; E06C 5/42; E06C 5/44; E06C 7/082; E06C 1/39; E04F 11/04; E04F 11/06; E04F 11/062; E04F 11/064; E04F 11/068; E04F 11/1041; B64F 1/315; E06B 7/092; E06B 9/322; E06B 9/307; E06B 9/32; E06B 2009/2452
  See application file for complete search history.

(56) References Cited

U.S. PATENT DOCUMENTS

| | | | |
|---|---|---|---|
| 1,761,726 A | 6/1930 | Hayes | |
| 1,791,330 A * | 2/1931 | Sprague | E06C 1/387 182/21 |
| 1,944,159 A | 1/1934 | Bailey | |
| 2,864,542 A | 12/1958 | Marryatt | |
| 4,363,150 A | 12/1982 | Nilsson | |
| 5,454,196 A * | 10/1995 | Gaines | E04F 11/06 52/183 |
| 6,832,667 B1 | 12/2004 | Kahre | |
| 7,159,261 B2 | 1/2007 | Carrigan | |
| 7,383,600 B2 | 6/2008 | Carrigan | |
| 8,074,767 B1 | 12/2011 | Denison | |
| 8,459,594 B2 | 6/2013 | Anger | |
| 8,622,173 B2 | 1/2014 | Fuqua et al. | |
| 9,260,916 B1 | 2/2016 | Brotherton | |
| 9,915,044 B2 | 3/2018 | Kalkman | |
| 10,267,122 B2 | 4/2019 | Toma | |

(Continued)

*Primary Examiner* — Colleen M Chavchavadze
(74) *Attorney, Agent, or Firm* — Schwartz Law Firm, P.C.

(57) ABSTRACT

A convertible ramp system facilitates transfer of personnel between spaced elevations. The ramp system includes a deck assembly, a convertible main ramp, and a convertible extension ramp. The convertible main ramp has a proximal end hinged to the deck assembly and a distal end adapted for being mechanically lifted and lowered relative to the deck assembly. Both the main ramp and the extension ramp incorporates an adjustable frame assembly and a series of simultaneously articulating foot treads carried by the frame assembly. The ramps are selectively convertible between a stairway configuration and a substantially flat and continuous runway configuration.

6 Claims, 14 Drawing Sheets

(56) References Cited

U.S. PATENT DOCUMENTS

| | | |
|---|---|---|
| 10,858,893 B2 | 12/2020 | Toma |
| 11,174,677 B2 * | 11/2021 | Clemente ................ B64F 1/315 |
| 11,591,854 B1 * | 2/2023 | Leines ...................... E06C 5/34 |
| 2007/0240936 A1 * | 10/2007 | Brookshire, Jr. ....... E06C 7/081 |
| | | 182/127 |

* cited by examiner

CONVERTIBLE RAMP SYSTEM AND TACTICAL VEHICLE INCORPORATING A CONVERTIBLE RAMP SYSTEM

TECHNICAL FIELD AND BACKGROUND OF THE DISCLOSURE

The present disclosure relates broadly and generally to a mobile adjustable and convertible ramp system and method. Mobile ramp systems for vehicles are generally known in the prior art. Examples of such systems are described in Applicant's prior U.S. Pat. Nos. 6,832,667 and 8,622,173. The complete disclosures of these prior patent are incorporated herein by reference.

The system and method disclosed in Applicant's '667 Patent incorporates dual, independently operating main ramps with internal extension ramps, or a single main ramp with a single extension ramp. In Applicant's current design, the exemplary independently operational ramp combinations are constructed and function in a similar manner, but have an added ability to selective convert between a generally planar runway surface and a stairway configuration. The selective conversion between planar runway surface and stairs can be either mechanical or manual-automatic or on-demand. In further alternative embodiments, the present ramp combination may incorporated a cantilevered front platform pivotably attached to a distal end of the extension ramp.

SUMMARY OF EXEMPLARY EMBODIMENTS

Various exemplary embodiments of the present disclosure are described below. Use of the term "exemplary" means illustrative or by way of example only, and any reference herein to "the invention" is not intended to restrict or limit the invention to exact features or steps of any one or more of the exemplary embodiments disclosed in the present specification. References to "exemplary embodiment," "one embodiment," "an embodiment," "various embodiments," and the like, may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

It is also noted that terms like "preferably", "commonly", and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

According to one exemplary embodiment, the present disclosure comprises a convertible ramp system adapted to facilitate transfer of personnel between spaced elevations. The ramp system comprises a deck assembly, a convertible main ramp, and an optional generally inline convertible extension ramp. The convertible main ramp has a proximal end hinged to the deck assembly and a distal end adapted for being mechanically lifted and lowered relative to the deck assembly. The main ramp incorporates an adjustable frame assembly and a series of simultaneously articulating foot treads carried by the frame assembly. The main ramp is selectively convertible between a stairway configuration and a substantially flat and continuous runway configuration. The convertible extension ramp is carried by the main ramp and comprises an adjustable frame assembly and a series of simultaneously articulating foot treads carried by the frame assembly. The extension ramp is selectively convertible between a stairway configuration and a substantially flat and continuous runway configuration adjacent the main ramp. An actuator is operatively connected to the frame assembly of the extension ramp. An electronic sensor determines a tilt angle of the foot treads of the main ramp. A controller communicates with the electronic sensor and the actuator, and is adapted for transmitting a control signal to the actuator based on the tilt angle determined by the electronic sensor. The control signal causes the actuator to pivot the foot treads of the extension ramp to a tilt angle corresponding substantially to the tilt angle of the foot treads of the main ramp.

According to another exemplary embodiment, the extension ramp is slidably movable relative to the main ramp between a stowed condition substantially underlying (and directly adjacent) the main ramp and a deployed condition extended outwardly from the main ramp.

According to another exemplary embodiment, the adjustable frame assembly of the main ramp includes first and second cooperating parallel side stringers. The side stringers are pivotably attached to the deck assembly at a first pivot point, and the articulating foot treads of the main ramp are pivotably attached to the side stringers of the main ramp.

According to another exemplary embodiment, each articulating foot tread of the main ramp has opposing tread ends, a front tread edge and a rear tread edge. The foot tread is pivotably attached to the first and second side stringers at its opposing tread ends proximate its rear tread edge.

According to another exemplary embodiment, the adjustable frame assembly of the main ramp further includes at least one control rail attached to the articulating foot treads of the main ramp proximate respective front tread edges.

According to another exemplary embodiment, the control rail is adapted for being selectively pivotably attached to the deck assembly at a second pivot point spaced apart from the first pivot point, such that:
  (i) when pivotably attached to the deck assembly at the second pivot point, the control rail automatically articulates the foot treads (simultaneously) to convert the main ramp to the stairway configuration as the main ramp is lifted from the deck assembly; and
  (ii) when detached from the deck assembly, the control rail resides in a fixed position adjacent and parallel to at least one of said first and second side stringers, whereby the main ramp remains in the runway configuration when lifted from the deck assembly.

According to another exemplary embodiment, wherein the electronic sensor is an electronic inclinometer.

According to another exemplary embodiment, the adjustable frame assembly of the extension ramp incorporates first and second parallel side stringers. The articulating foot treads of the extension ramp are pivotably attached to the first and second side stringers of the extension ramp.

According to another exemplary embodiment, each articulating foot tread of the extension ramp has opposing tread ends, a front tread edge and a rear tread edge. The foot tread is pivotably attached to the first and second side stringers at its opposing tread ends proximate its front tread edge.

According to another exemplary embodiment, the adjustable frame assembly of the extension ramp further includes at least one control rail attached to the articulating foot treads of the extension ramp proximate respective rear tread edges.

According to another exemplary embodiment, a rack and pinion drive assembly is operatively attached to the extension ramp, and incorporates a drive shaft and extension motor (e.g., gear motor) designed for controlling movement of the extension ramp relative to the main ramp.

According to another exemplary embodiment, the controller is adapted for transmitting a second control signal to the extension motor based on a rise distance between adjacent foot treads of the main ramp. The second control signal causes the drive assembly to automatically adjust movement of the extension ramp such that a first foot tread of the extension ramp is spaced apart from a last foot tread of the main ramp a distance corresponding substantially to the rise distance between adjacent foot treads of the main ramp.

According to another exemplary embodiment, a second electronic sensor determines a tilt angle of the foot treads of the extension ramp, and transmits the tilt angle of the foot treads of the extension ramp to the controller for comparison with the tilt angle of the foot treads of the main ramp.

In yet another exemplary embodiment, the present disclosure comprises a tactical vehicle having a cab portion located at a front of the vehicle and a vehicle bed located at a rear of the vehicle, and a convertible ramp system adapted to facilitate transfer of personnel between said vehicle and a spaced elevation. The convertible ramp system may incorporate each of the structural elements and features disclosed herein including a deck assembly, a vehicle-mount frame assembly attached to the deck assembly and mounting the deck assembly above the bed of the tactical vehicle, a convertible main ramp, and a generally inline convertible extension ramp. One or more handrails (or safety rails) may be located along opposite sides of one or both ramps.

The term "tactical vehicle" refers broadly herein to any self-propelled, boosted, or towed military and non-military (e.g., police) conveyance capable of transport by land, sea, or air. The vehicle may have wheels, tracks, skids, floats, and/or other maneuvering structure.

BRIEF DESCRIPTION OF THE DRAWINGS

Exemplary embodiments of the present disclosure will hereinafter be described in conjunction with the following drawing figures, wherein like numerals denote like elements, and wherein.

DESCRIPTION OF EXEMPLARY EMBODIMENTS AND BEST MODE

The present invention is described more fully hereinafter with reference to the accompanying drawings, in which one or more exemplary embodiments of the invention are shown. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention, which is to be given the full breadth of the appended claims and any and all equivalents thereof. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Figure 1:
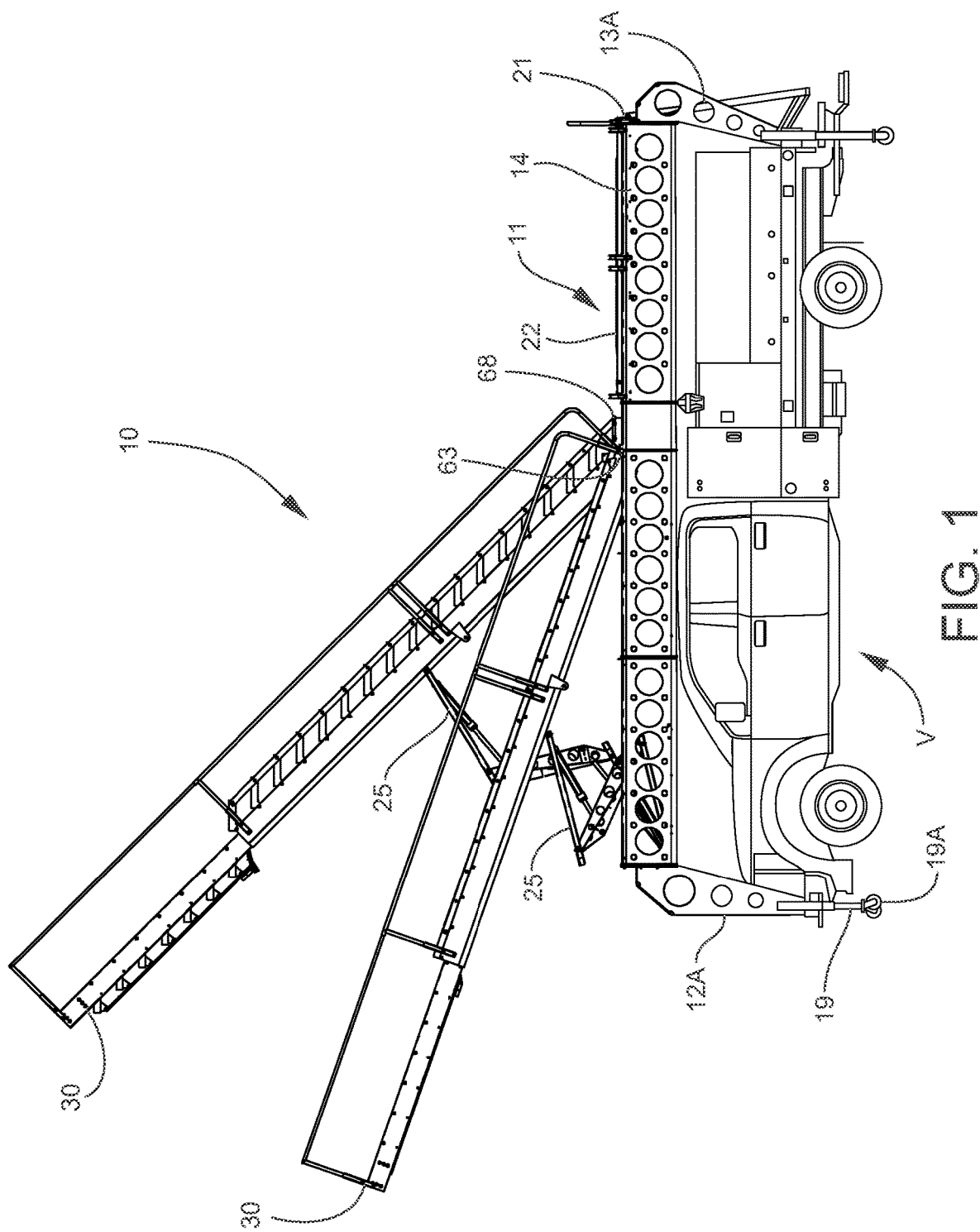
FIG. 1 shows a tactical vehicle incorporating a mobile convertible ramp system according to one exemplary embodiment of the present disclosure.

Referring now specifically to the drawings, a mobile convertible ramp system according to one exemplary embodiment is illustrated in FIG. 1 and shown generally at broad reference numeral 10. The exemplary ramp system 10 may used alone as a self-supported mobile structure or in combination with a tactical self-propelled motor vehicle "V". The tactical vehicle "V" may comprise wheels, a front cab portion, and a rear bed, and other generally conventional parts and assemblies including, for example, a heavy duty chassis, suspension, engine, clutch, gears, differential, drive shaft, driveline, drive train, transmission, and axles. In exemplary embodiments, the present convertible ramp system 10 serves to facilitate transfer of personnel between the vehicle "V" and a higher elevation.

As shown in FIGS. 1-5, the exemplary ramp system 10 includes a vehicle-mount frame assembly 11 incorporating pairs of front and rear vertical supports 12A, 12B and 13A, 13B and opposing horizontal side beams 14, 15. Each side beam 14, 15 may comprise a single integrally-formed structural element or a series of elements bolted or welded together (or otherwise attached) end-to-end between the pairs of front and rear vertical supports 12A, 12B and 13A, 13B. The side beams 14, 15 may attach to the vertical supports 12A, 12B and 13A, 13B by bolts, rivets, welding, or other suitable means. The front vertical supports 12A, 12B may attach to a front of the vehicle "V" using, for example, mounting brackets, plates and other hardware. The rear vertical supports 13A, 13B may be affixed to a step 17 attached to the vehicle chassis and ladders 18 extending to the deck surface 22. Each of the front and rear vertical supports 12A, 12B and 13A, 13B may further comprise length-adjustable (e.g., telescoping) end shafts 19 with wheels 19A designed to facilitate independent mobile use of the convertible ramp system 10 when detached from the vehicle "V".

The exemplary convertible ramp system 10 incorporates an elevated deck assembly 21 carried by the vehicle-mount frame assembly 11, and defining a substantially flat and continuous deck surface 22 for supporting personnel. In one embodiment, the deck surface 22 extends between the front to the rear of the vehicle "V", and substantially covers the vehicle's rear bed.

Figure 3:
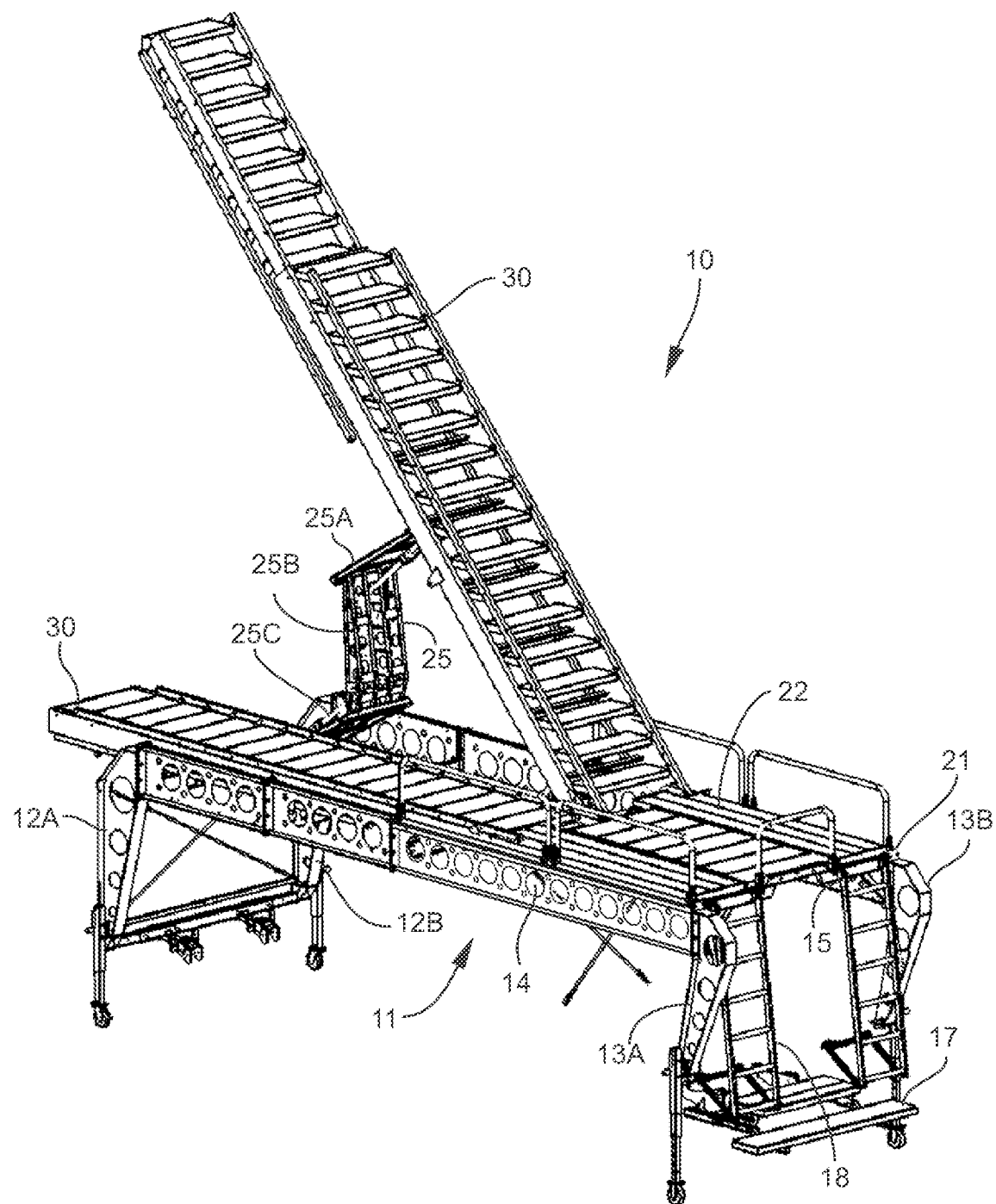
Figure 5:
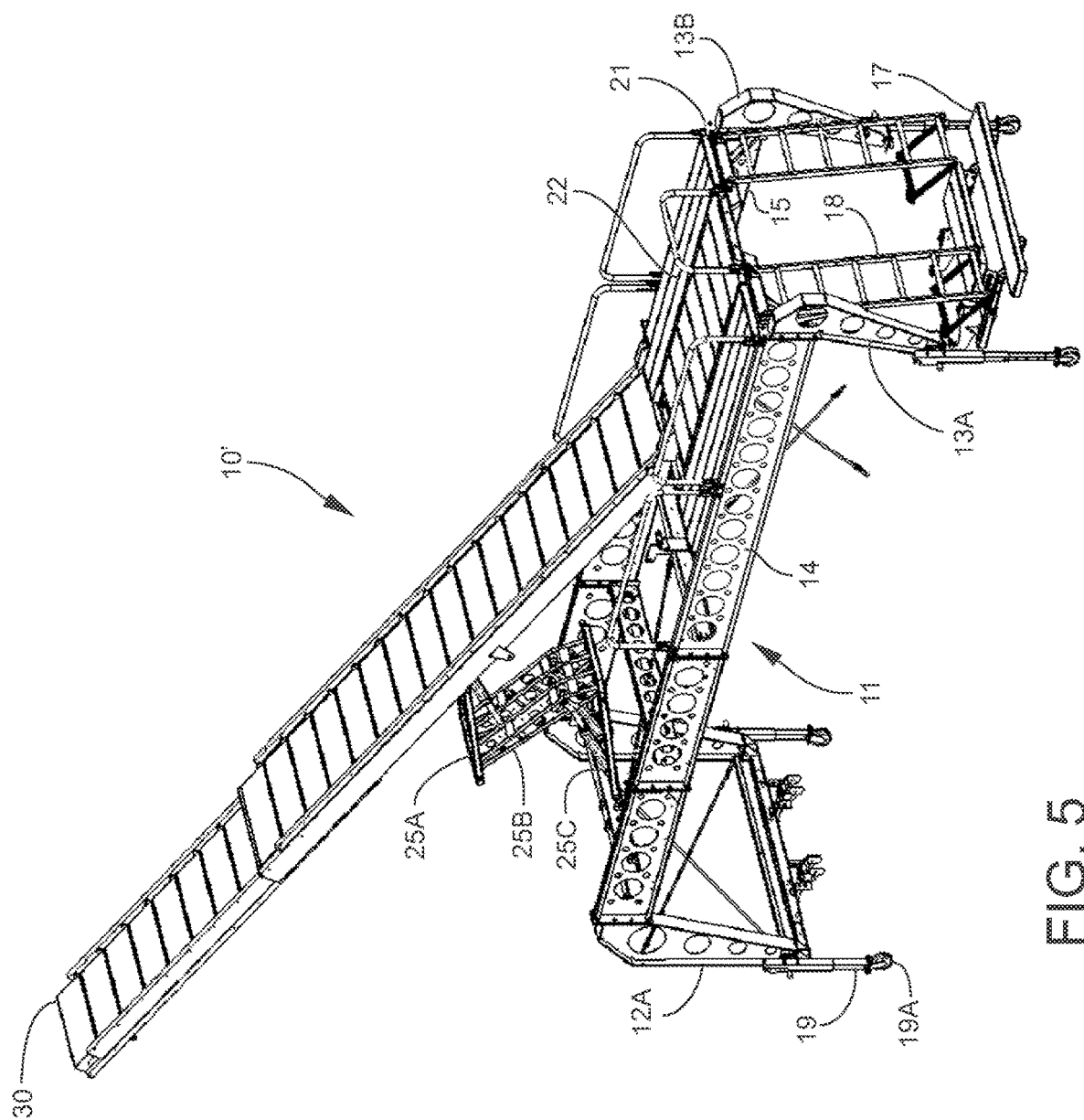
FIG. 5 is a perspective view of a modified convertible ramp system incorporating only a single ramp combination.

Dual, independently operable ramp combinations 30 are located on the elevated deck assembly 21, and are each designed to lift and lower relative to the deck surface 22 employing a two-stage scissor-type lift system 25. As best shown in FIGS. 3 and 5, the exemplary lift system 25 comprises three pivoted lift sections 25A, 25B, 25C that cooperate to raise the ramp combination 30 when the lift sections 25A, 25B, 25C are extended or unfolded, and to lower the ramp combination 30 when the lift sections 25A, 25B, 25C are retracted or folded together. The lift sections 25A, 25B, 25C may be actuated using one or more pneumatic or hydraulic cylinders or other such means. In one example, as the cylinder extends, it opens the first and second (upper) lift sections 25A, 25B of the scissors. The first and second lift sections 25A, 25B are pivotably connected at respective proximal ends so when opening or unfolding, the sections resemble a sideways "V". The third (or lower) lift section 25C is pivotably attached to the second lift section 25B and to the deck assembly 21, such that as all three lift sections 25A, 25B, 25C pivot to open, they resemble a sideways "N". This enables the modified 3-section scissor lift system 25 to lift the ramp combinations 30 much higher than traditional 2-section scissor designs, such as disclosed in Applicant's '667 Patent. The present lift system 25 may utilize two or more cylinders to actuate the first and second upper lift sections 25A, 25B, and a single cylinder to actuate the third lower lift section 25C, or vise-versa. A modified convertible ramp system 10' incorporating only a single ramp combination 30 is illustrated in FIG. 5. All other structural elements and features of ramp system 10' are identical to those of ramp system 10.

Figure 4:
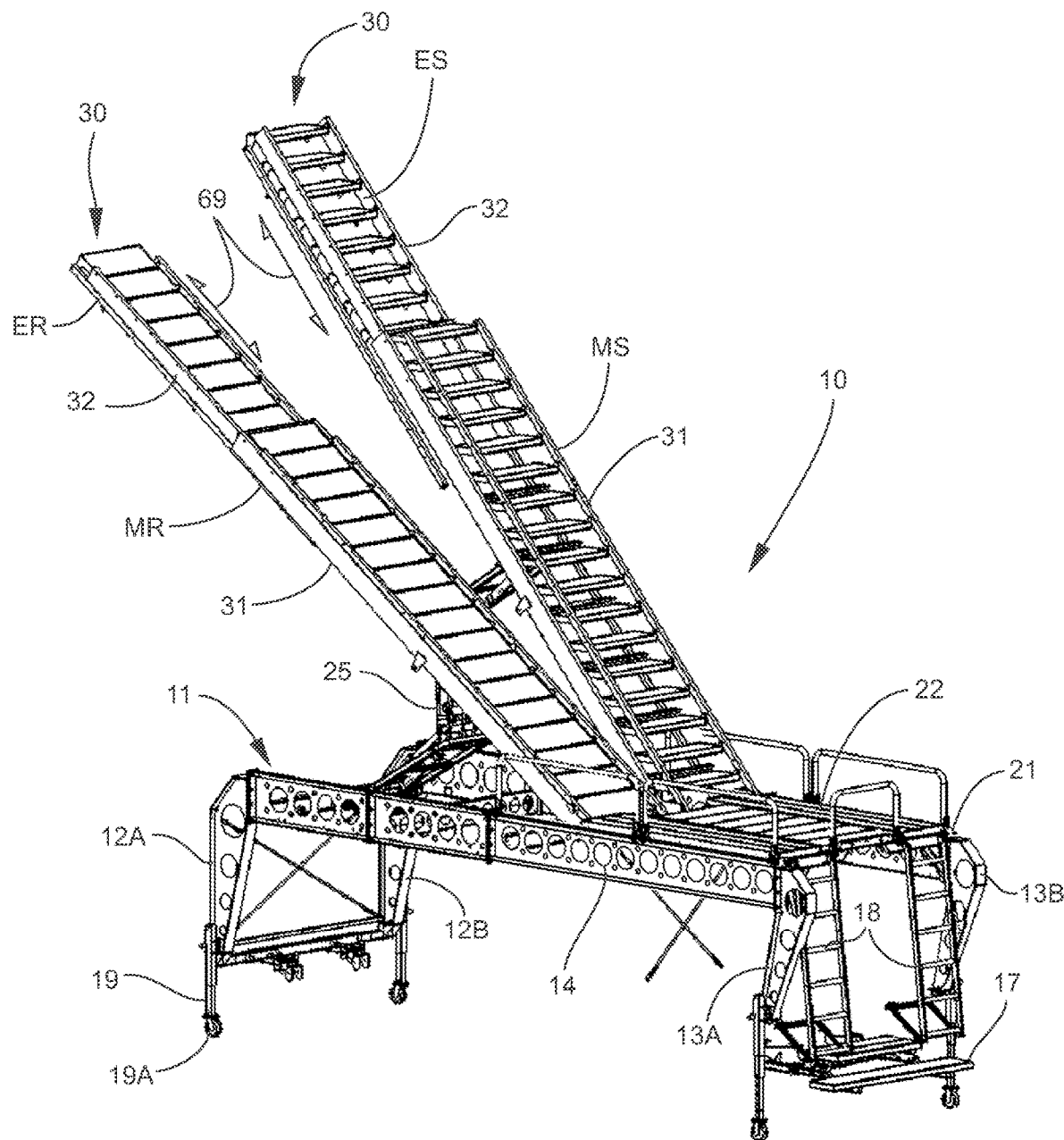
Figure 6:
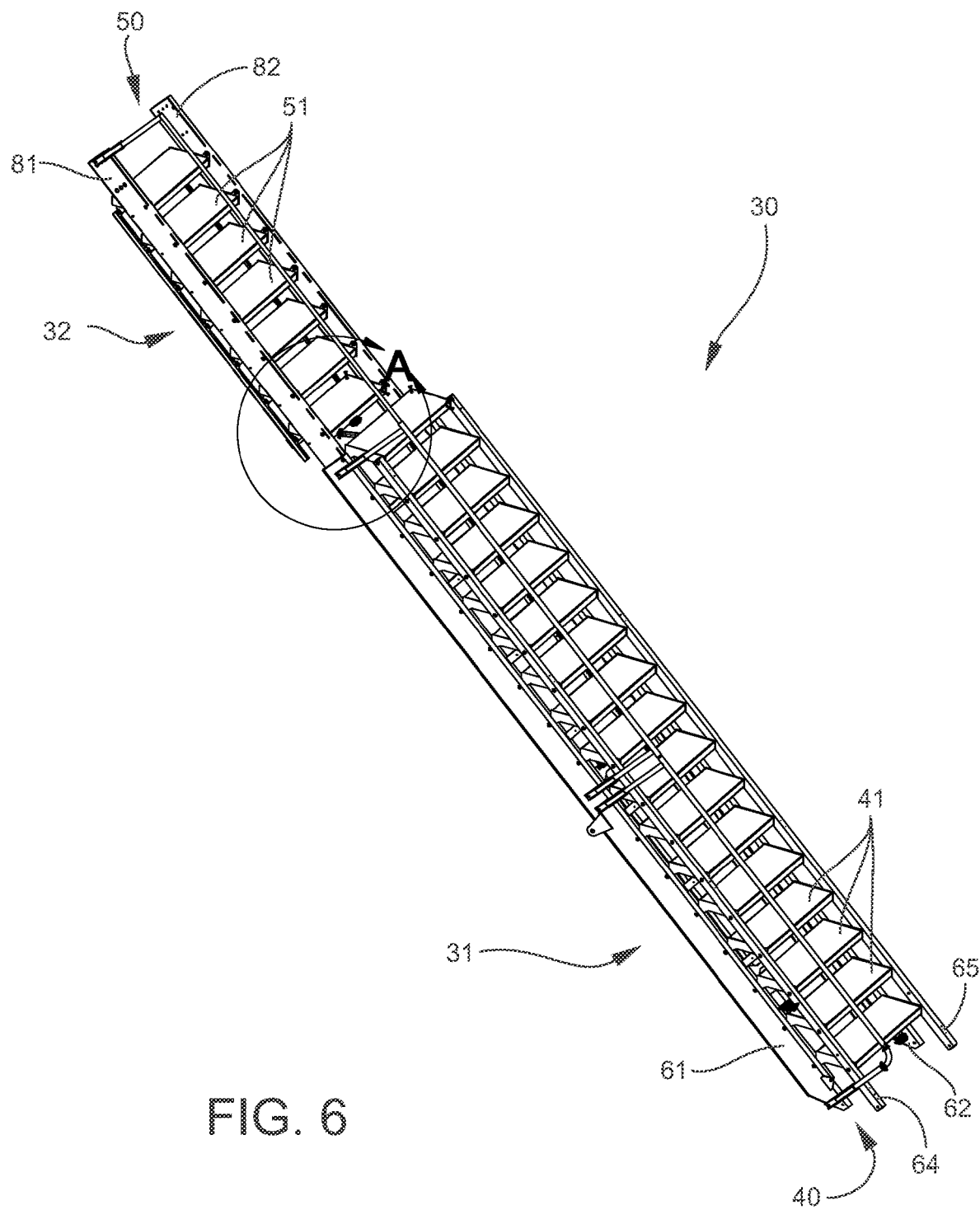
FIG. 6 is a perspective view of an exemplary ramp combination with the both the main ramp and the deployed extension ramp in stair configurations.

Referring to FIGS. 4 and 6, each ramp combination 30 may comprise a convertible main ramp 31 and a generally inline convertible extension ramp 32. The convertible main ramp 31 has a proximal end hinged to the deck assembly 21 and a distal end adapted for being mechanically lifted and lowered relative to the deck assembly 21 utilizing the 3-section scissor lift system 25 described above. The main ramp 31 incorporates an adjustable frame assembly 40 and a series of simultaneously articulating foot treads 41 carried by the frame assembly 40. As best shown in FIG. 4, the main ramp 31 of each combination 30 is selectively convertible between a stairway configuration "MS" and a substantially flat and continuous runway configuration "MR". The convertible extension ramp 32 is carried by the main ramp 31 and likewise comprises an adjustable frame assembly 50 and a series of simultaneously articulating foot treads 51 carried by the frame assembly 50. Like the main ramp 31, the extension ramp 32 is selectively convertible between a stairway configuration "ES" and a substantially flat and continuous runway configuration "ER" adjacent the main ramp 31. The exemplary main ramp 31 and exemplary extension ramp 32 are described separately and in further detail below.

Convertible Main Ramp 31

Figure 7:
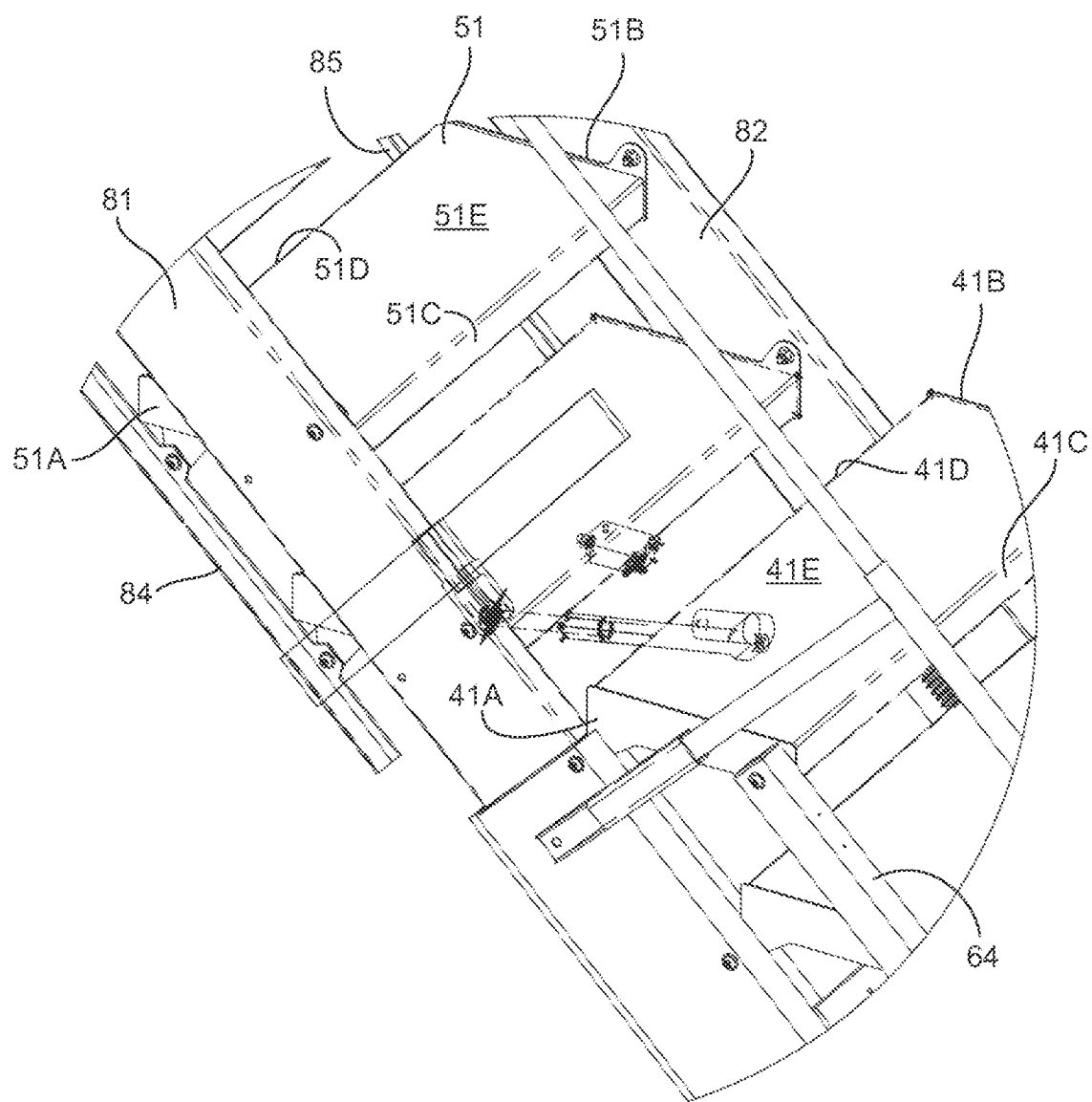
FIG. 7 is an enlarged view of the circular area designated at "FIG. 7" in FIG. 6.

As best shown in FIGS. 4, 6, and 7, the adjustable frame assembly 40 of the main ramp 31 includes first and second cooperating parallel side stringers 61, 62 each pivotably attached to the deck assembly 21 at a first pivot point 63. The side stringers 61, 62 may be pivotably attached to the deck assembly 21 via any mechanical means including releasable pins, bolts, locks, brackets or the like. The series of articulating foot treads 41 are carried by the two side stringers 61, 62. Each foot tread 41 has opposite tread ends 41A, 41B, a front tread edge 41C, a rear tread edge 41D, and a top surface 41E between the edges 41C, 41D. The top surface 41E of each foot tread 41 may be perforated and/or textured. The foot treads 41 are each pivotably attached to the side stringers 61, 62 at respective opposite tread ends 41A, 41B proximate respective rear tread edges 41D.

First and second control rails 64, 65 of the frame assembly 40 are pivotably attached to opposite ends 41A, 41B of respective foot treads 41 proximate respective front tread edges 41C, and are capable of moving independent of the two side stringers 61, 62. The two control rails 64, 65 are selectively pivotably attached to the deck assembly 21 at a second pivot point 68 spaced apart from the first pivot point 63, such that (i) when pivotably attached to the deck assembly 21 at the second pivot point 68, the control rails 64, 65 automatically articulate the foot treads 41 (simultaneously) to convert the main ramp 31 to the stairway configuration "MS" as the main ramp 31 is lifted from the deck surface 22, and (ii) when detached from the deck assembly 21 at the second pivot point 68, the control rails 64, 65 reside in a fixed position adjacent and parallel to the side stringers 61, 62, whereby the main ramp 31 remains in the runway configuration "MR" when lifted from the deck surface 22. The second pivot point 68 is precisely located such that the foot treads 41 maintain a substantially horizontal orientation throughout the entire lift range of the main ramp 31 when in the stairway configuration "MS". The control rails 64, 65 may be selectively attached to the deck assembly 21 at the second pivot point 68 via any mechanical means including releasable pins, bolts, locks, brackets or the like. When detached from the deck assembly 21 at the second pivot point 68, the control rails 64, 65 may be affixed directly immediately adjacent (e.g., overlying) the side stringers 61, 62 of the main ramp 31.

Convertible Extension Ramp 32

Figure 8:
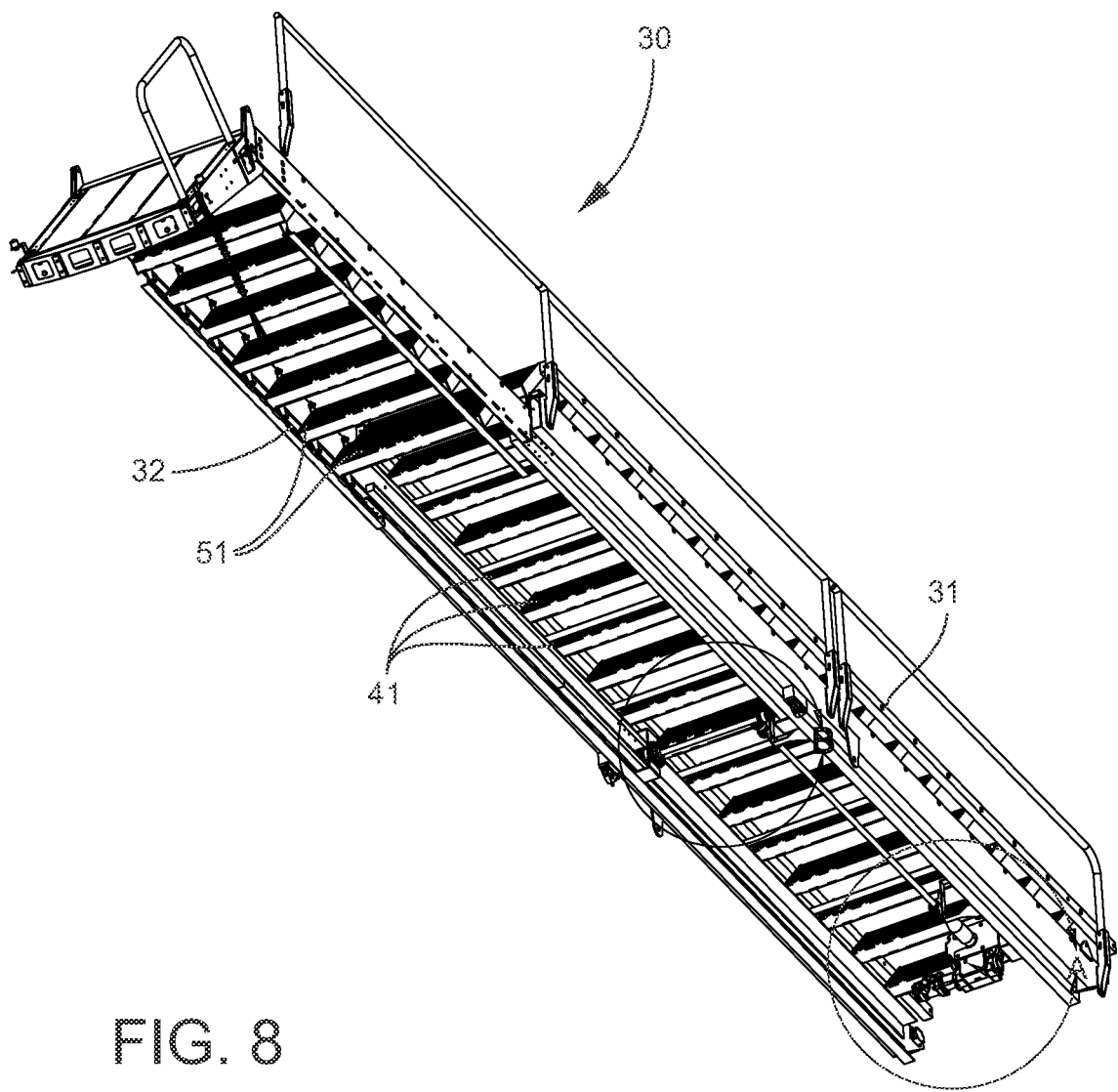
FIG. 8 is a further perspective view of the exemplary ramp combination in the stair configuration.
Figure 9:
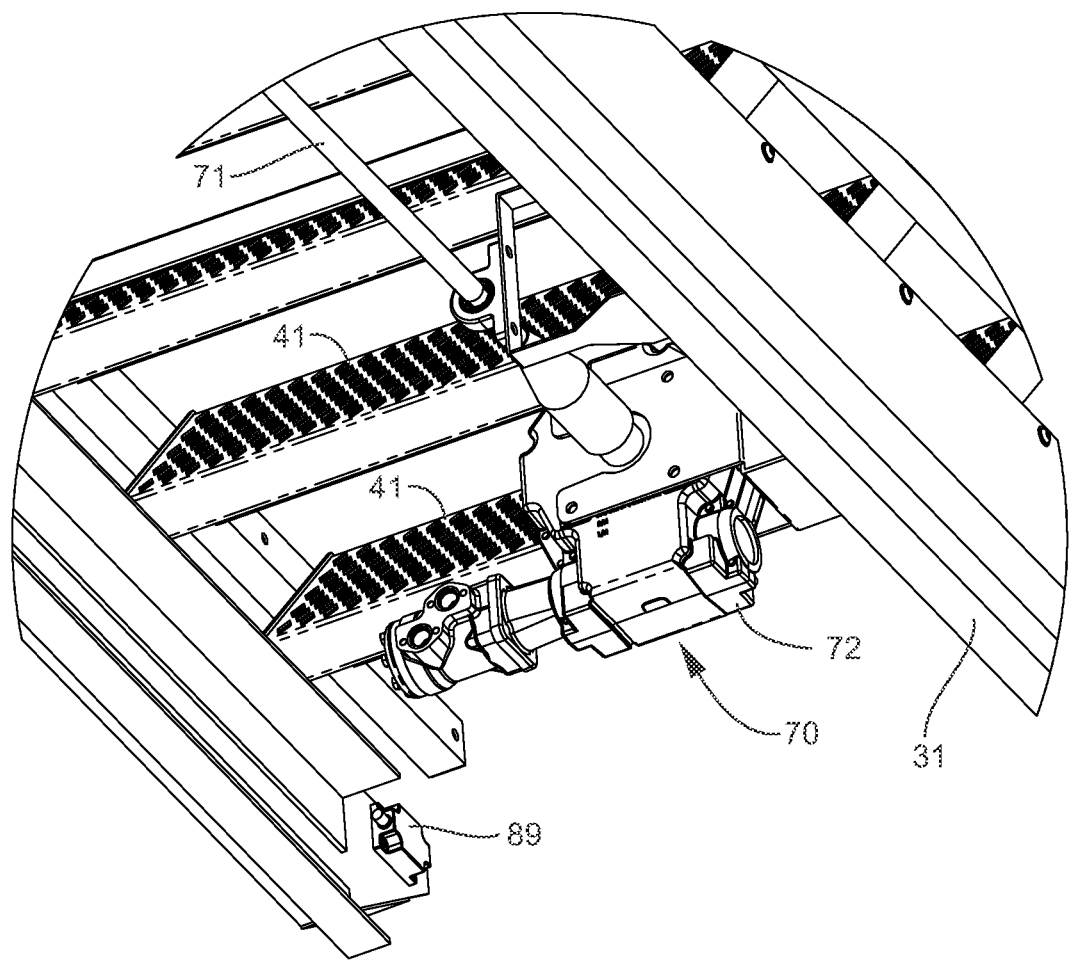
FIG. 9 is an enlarged view of the circular area designated at "FIG. 9" in FIG. 8.
Figure 10:
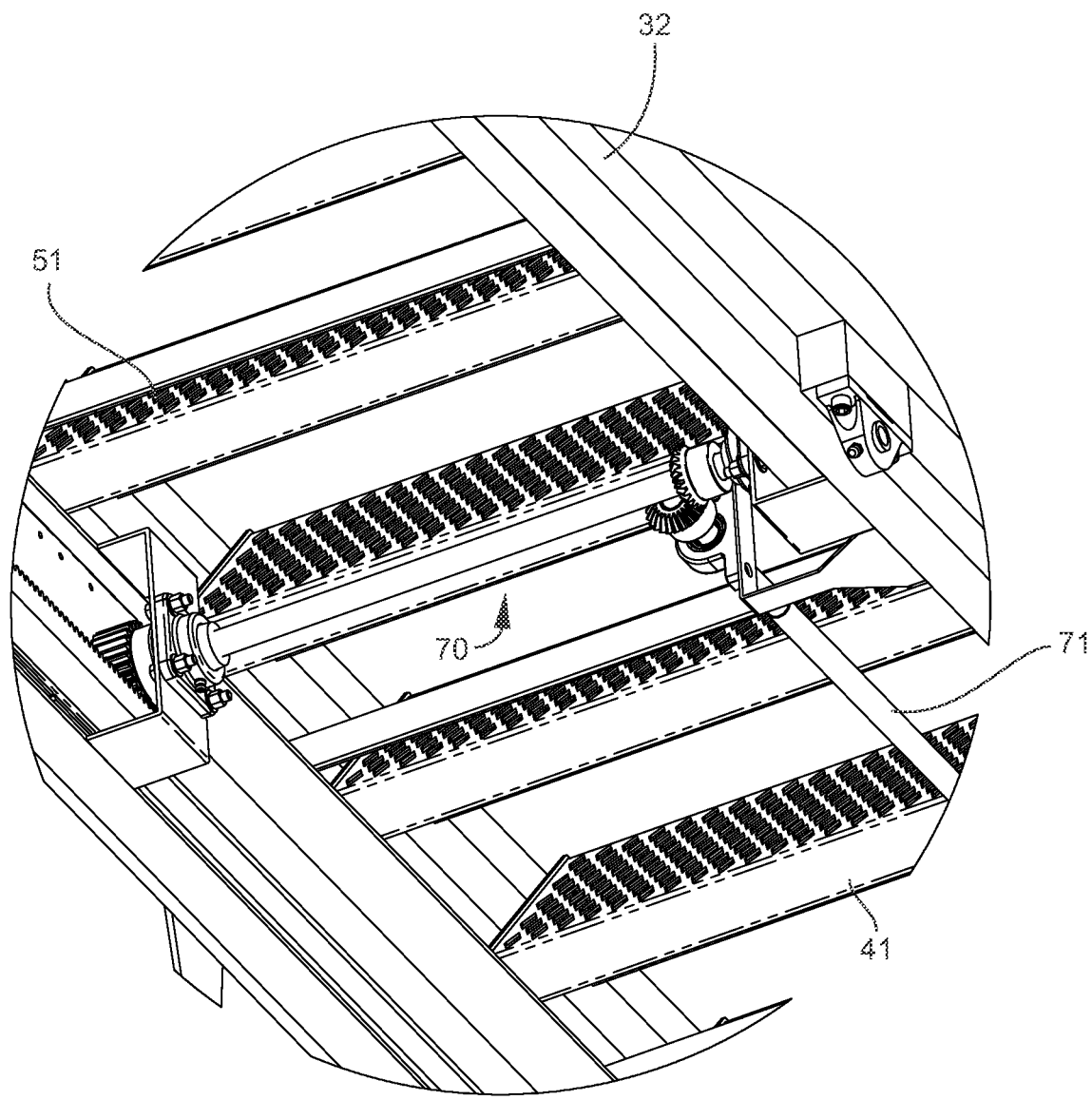
FIG. 10 is an enlarged view of the circular area designated at "FIG. 10" in FIG. 8.

Referring to FIGS. 4 and 8-13, the convertible extension ramp 32 is slidably movable relative to the main ramp 31, as indicated at direction arrows 69 in FIG. 4, between a stowed condition substantially underlying (and directly adjacent) the main ramp 31 and a deployed condition extended outwardly from the main ramp 31. As best shown in FIGS. 8, 9, and 10, the exemplary ramp combination 30 incorporates a rack and pinion drive assembly 70 operatively engaging the extension ramp 32, and including a drive shaft 71 and extension motor 72 (e.g., gear motor) designed for controlling generally inline linear movement of the extension ramp 32 relative to the main ramp 31. The extension motor 72 may comprise or interface with other electronics including a transmitter, receiver, transceiver, microprocessor, sensors, and memory.

Like the exemplary main ramp 31, the adjustable frame assembly 50 of the convertible extension ramp 32 includes first and second cooperating parallel side stringers 81, 82-best shown in FIGS. 6 and 7. The side stringers 81, 82 reside in underlying telescoping relation to the side stringers 61, 62 of main ramp 31, such that the extension ramp 32 nests substantially inside a length of the main ramp 31 when in its stowed condition (See FIG. 2). The series of articulating foot treads 51 of the extension ramp 32 are carried by the two side stringers 81. 82. Each foot tread 51 has opposite tread ends 51A, 51B, a front tread edge 51C, a rear tread edge 51D, and a top surface 51E between the edges 51C, 51D. The top surface 51E of each foot tread 51 may be perforated and/or textured. The foot treads 51 are each pivotably attached to the side stringers 81, 82 at respective opposite tread ends 51A, 51B proximate respective front tread edges 51C. First and second control rails 84, 85 of the frame assembly 50 are pivotably attached to opposite ends 51A, 51B of respective foot treads 51 proximate respective rear tread edges 51D, and are capable of moving independent of the two side stringers 81, 82.

Figure 11:
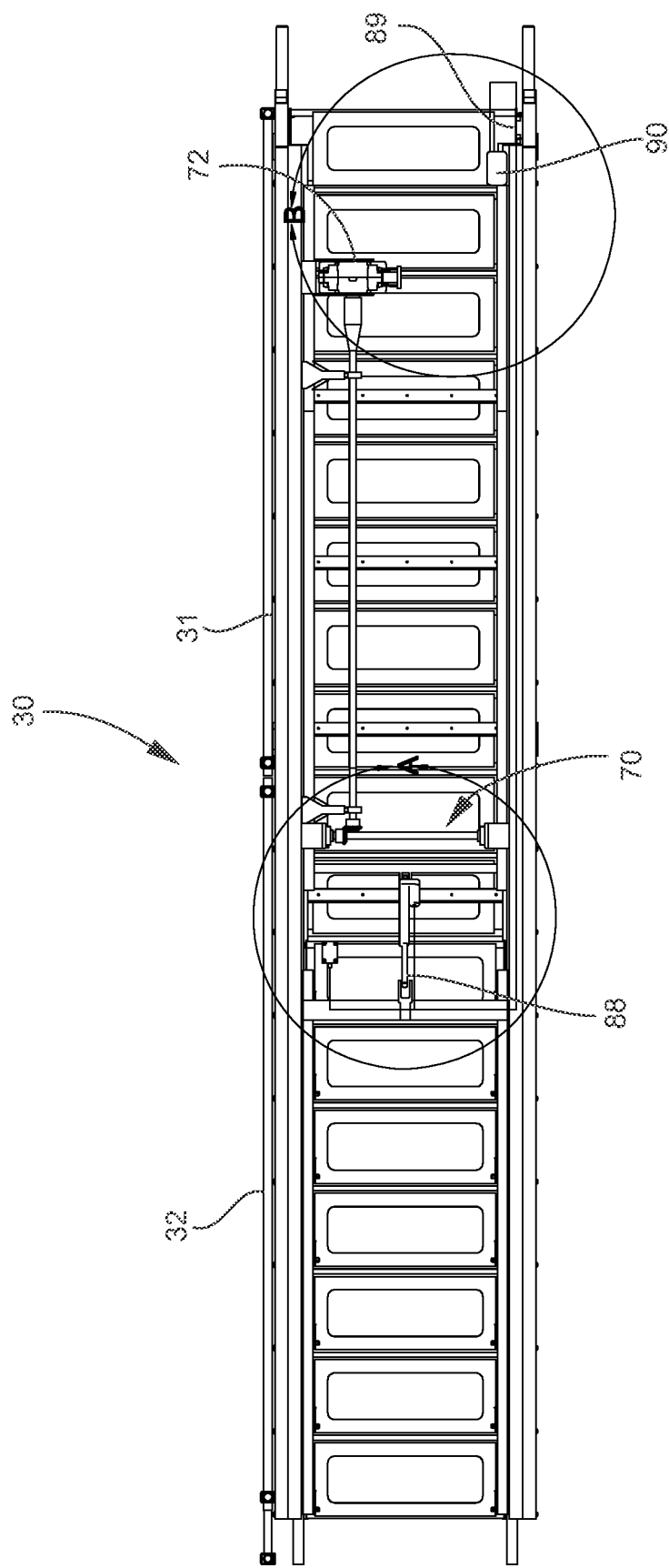
FIG. 11 is a view illustrating an underside of the ramp combination with the extension ramp deployed.
Figure 12:
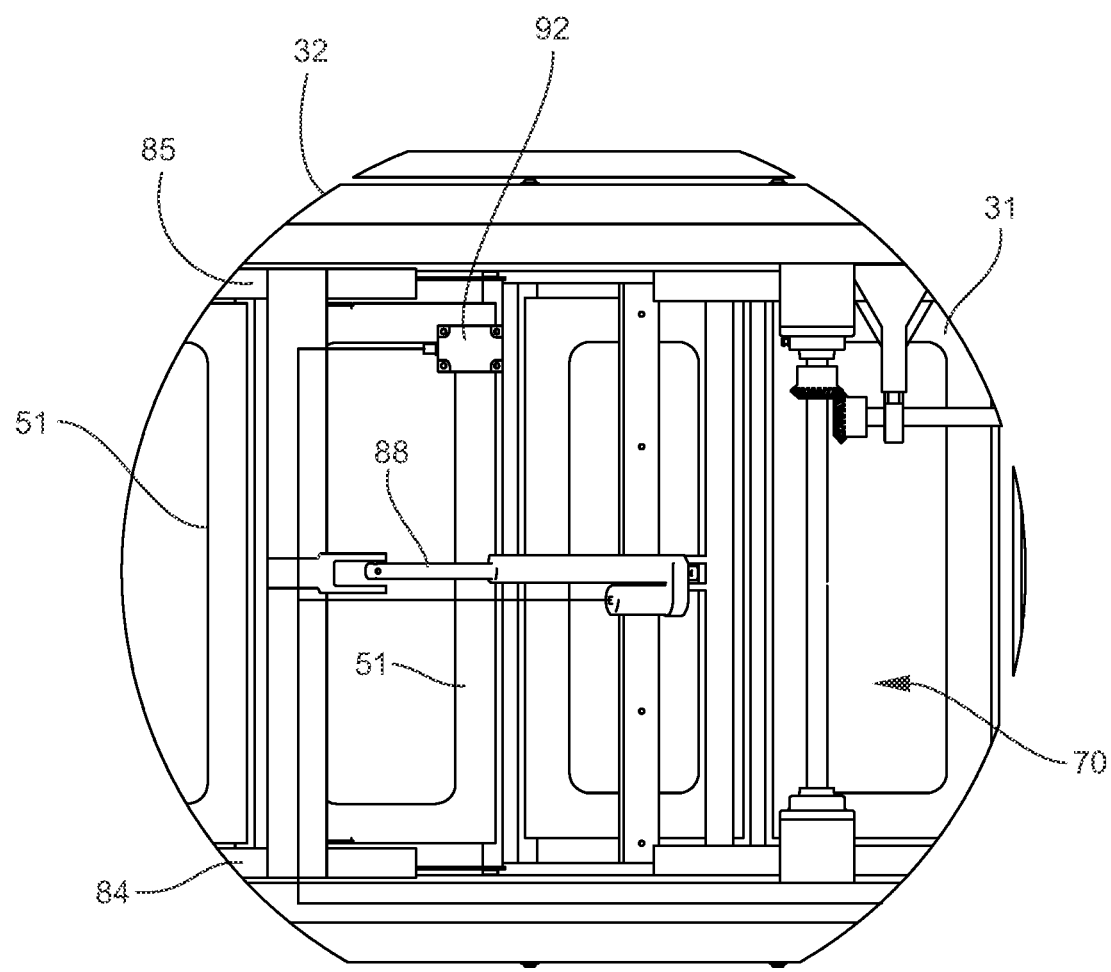
FIG. 12 is an enlarged view of the circular area designated at "FIG. 12" in FIG. 11.

Referring to FIGS. 11 and 12, in one exemplary embodiment, an electromechanical linear actuator 88 is operatively linked to one or both of the control rails 84, 85 of the extension ramp 32, and when activated functions to set the tilt angle of the foot treads 51 by simultaneously shifting the control rails 84, 85 inwardly towards the ramp assembly 21 and outwardly away from the ramp assembly 21. An electronic sensor 89 is carried by the main ramp 31, and determines a tilt angle of the foot treads of the main ramp 31 when in the stairway configuration "MS". The exemplary sensor 89 may comprise an inclinometer, rotary encoder, or other such device.

Figure 13:
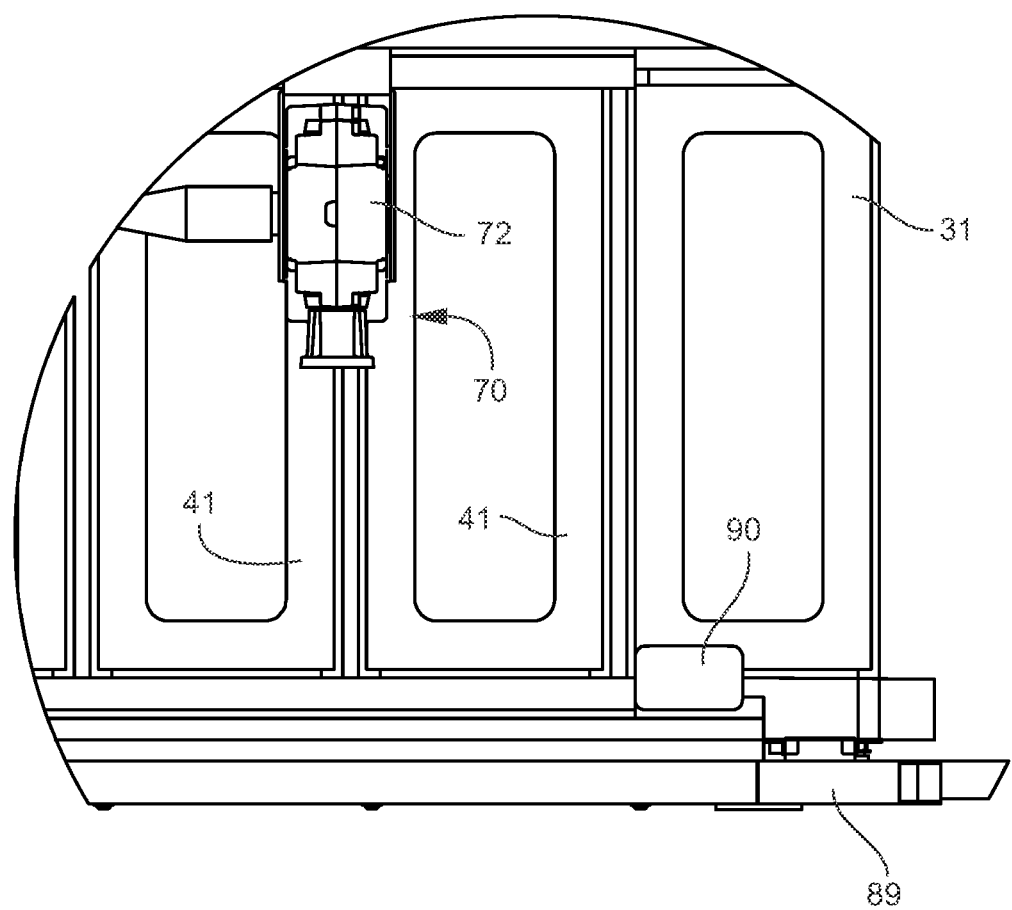
FIG. 13 is an enlarged view of the circular area designated at "FIG. 13" in FIG. 11.

A controller 90 shown in FIGS. 11 and 13 is located on the main ramp 31 and communicates with the electronic sensor 89 and the actuator 88, and wirelessly (or via hard wiring) transmits a control signal to the actuator 88 based on the tilt angle determined by the electronic sensor 89. The control signal causes the actuator 88 to pivot the foot treads 51 of the extension ramp 32 to a tilt angle corresponding substantially to the tilt angle of the foot treads 41 of the main ramp 31. The exemplary controller 90 may comprise a CAN network central information hub, and may incorporate or interface with a microprocessor, memory, transmitter, receiver, transceiver, modem, chipsets and other hardware, firmware, and software applicable for managing and directing the flow of data between and among the actuator 88 and electronic sensor 89. Each of the actuator 88 and electronic sensor 89 may likewise comprise or interface with other electronic components including a transmitter, receiver, transceiver, microprocessor, modem, memory and others.

The exemplary controller 90 may also wirelessly (or via hard wiring) transmit a second control signal to the extension motor 72 based on a rise distance between adjacent foot treads 41 of the main ramp 31. The second control signal causes the drive assembly 70 to automatically adjust linear movement of the extension ramp 32 such that a first foot tread 51 of the extension ramp 32 is spaced apart from a last foot tread 41 of the main ramp 31 a distance corresponding substantially to the rise distance between adjacent foot treads 41 of the main ramp 31. For example, in the event the extension ramp 32 were to partially deploy such that its first exposed foot tread 51 locates only 2-inches above the last foot tread 41 of the main ramp 31, the controller 90 would command the extension motor 72 to drop the extension ramp 32 two inches in order to properly align the first foot tread 51 of the extension ramp 32 with the last foot tread 41 of the main ramp 31—thereby maintaining a consistent rise (e.g., 8-inch rise) from the bottom of the main ramp 31 to the top of the extension ramp 32 with the ramp combination 30 in the stair configuration.

Additionally, a second electronic sensor 92 (e.g., inclinometer) shown in FIG. 12 may be located on or proximate the extension ramp 32 and utilized to determine the tilt angle of the extension ramp foot treads 51. The sensor 92 may transmit the measured tilt angle to the controller 90 for comparison with the measured tilt angle of the foot treads 41 of the main ramp 31. In the event a discrepancy, the controller 90 may cause the actuator 88 to adjust the tilt angle of the extension ramp foot treads 51 as needed to more closely correspond to the tilt angle of the main ramp foot treads 41.

A block diagram demonstrating operation of the exemplary ramp system described above is provided at FIG. 14.

Figure 2:
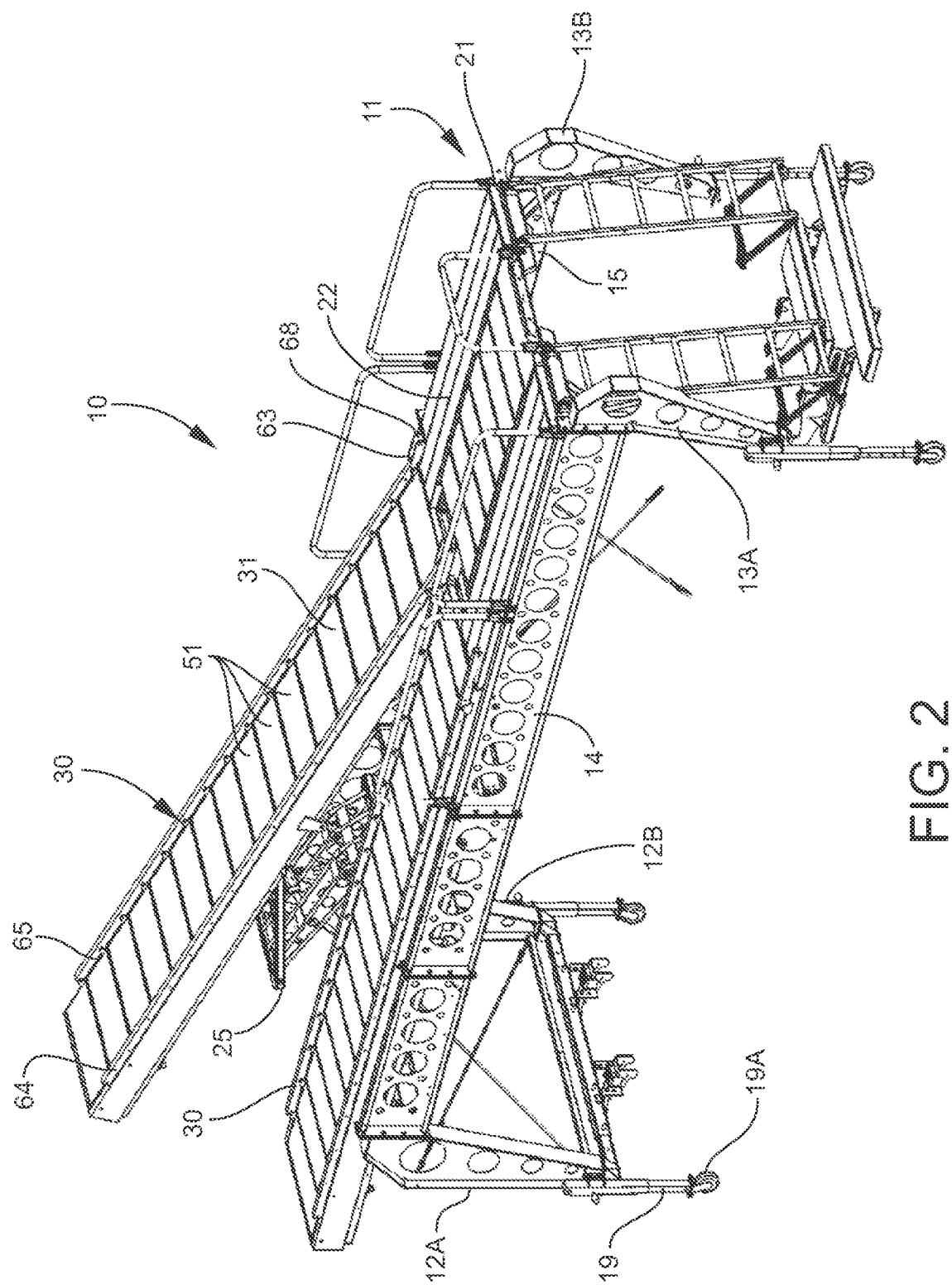
FIGS. 2, 3, and 4 are perspective views illustrating the exemplary convertible ramp systems in various positions and configurations.
Figure 14:
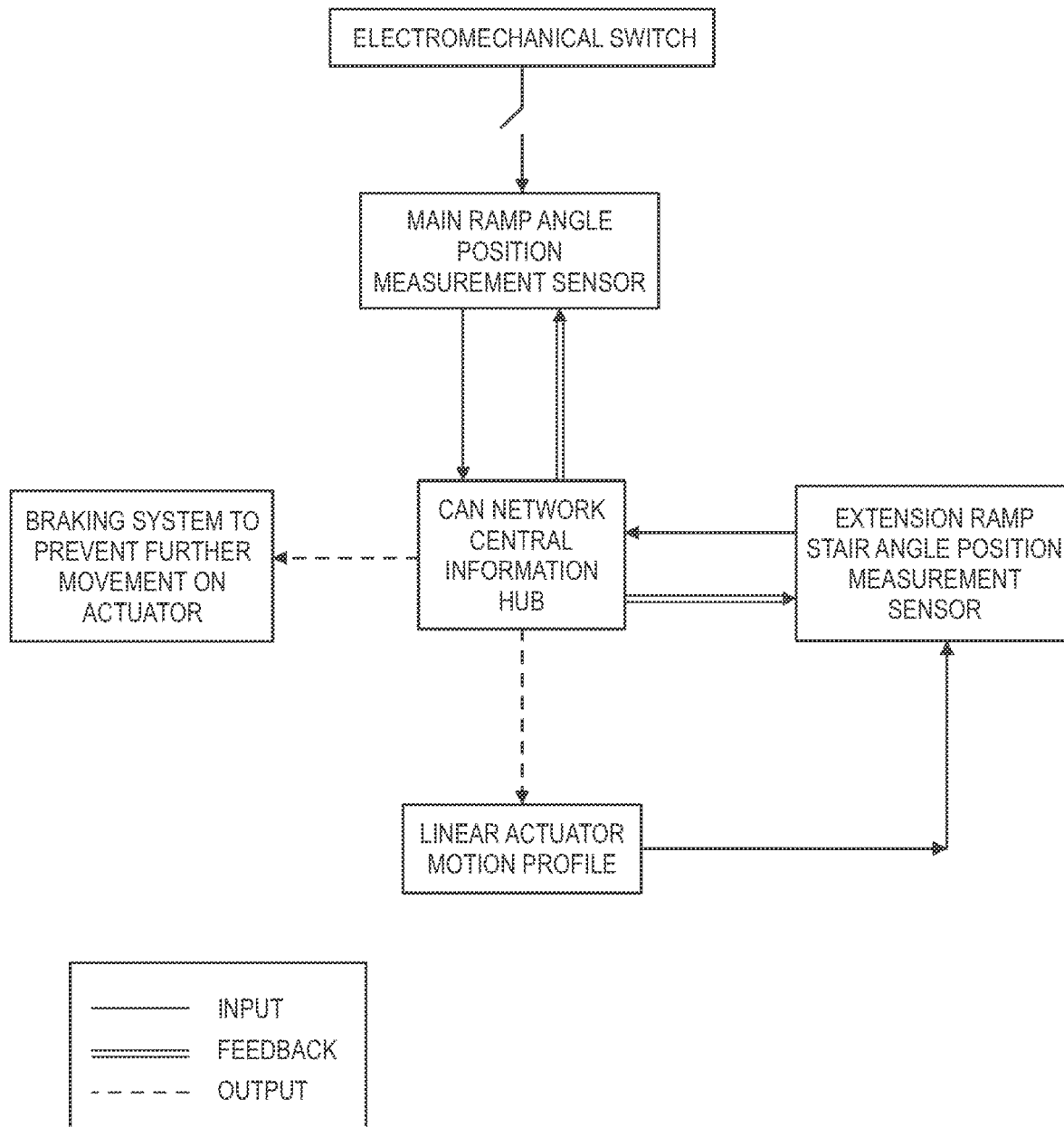
FIG. 14 is a block diagram demonstrating operation of the exemplary ramp system.

Referring to FIGS. 2 and 14, attaching the control rails 64, 65 of the main ramp 31 to the deck assembly 21 at the second pivot point 68 closes an electrical switch 94 which thereby activates the various electronics, sensors and other devices described above and utilized in properly converting and maintaining the ramp combination 30 in a stair configuration. When the electrical switch 94 is open-control rails 64, 65 being detached at the second pivot point 68, the ramp combination 30 is maintained in the runway configuration throughout its entire lift range.

In alternative exemplary embodiments, the present convertible ramp combination may be designed to mechanically lift from any deck surface or platform to a higher elevation, and may be utilized separate and apart from the tactical vehicle as a means to facilitate transfer of personnel between any spaced elevations. All components and assemblies of the vehicle and system described herein may be interconnected using any suitable hardware, such as pivot pins, bolts, nuts, brackets, screws, or the like, and other means, such as welding and self-locking joints. One or both of the main ramp and extension ramp may also comprise longitudinal hand rails for added safety.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under 35 U.S.C. § 112 (f) [or 6th paragraph/pre-AIA] is not intended. Additionally, it is not intended that the scope of patent protection afforded the present invention be defined by reading into any claim a limitation found herein that does not explicitly appear in the claim itself.

What is claimed:

1. A method for facilitating transfer of personnel between spaced elevations, said method system comprising:
    positioning a main ramp on a supporting surface;
    converting the main ramp between a stairway configuration and a substantially flat and continuous runway configuration, the main ramp comprising articulating foot treads, a proximal end located at the supporting surface, and a distal end adapted for being mechanically lifted and lowered relative to the supporting surface;
    moving an extension ramp relative to the distal end of the main ramp, the extension ramp comprising articulating foot treads;
    converting the extension ramp between a stairway configuration and a substantially flat and continuous runway configuration adjacent the main ramp;
    using a first electronic sensor, determining a tilt angle of the foot treads of the main ramp;
    using a second electronic sensor, determining a tilt angle of the foot treads of the extension ramp;
    transmitting the tilt angle of the foot treads of the main ramp to a controller;
    transmitting the tilt angle of the foot treads of the extension ramp to the controller;
    using the controller, comparing the tilt angle of the foot treads of the main ramp to the tilt angle of the foot treads of the extension ramp; and
    using the controller, transmitting a control signal to an actuator based on the tilt angle comparison made by the controller, such that the control signal causes the actuator to pivot the foot treads of the extension ramp to a tilt angle corresponding substantially to the tilt angle of the foot treads of the main ramp.

2. The method according to claim 1, and comprising slidably moving the extension ramp relative to the main ramp between a stowed condition substantially underlying the main ramp and a deployed condition extended outwardly from the main ramp.

3. The method according to claim 1, and comprising mechanically controlling movement of the extension ramp relative to the main ramp using a rack and pinion drive assembly.

4. The method according to claim 1, and comprising automatically adjusting movement of the extension ramp such that a first foot tread of the extension ramp is spaced apart from a last foot tread of the main ramp a distance corresponding substantially to a rise distance between adjacent foot treads of the main ramp.

5. The method according to claim 1, and comprising simultaneously articulating the foot treads of the main ramp.

6. The method according to claim 1, and comprising simultaneously articulating the foot treads of the extension ramp.

* * * * *